(12) United States Patent
Olson

(10) Patent No.: US 6,456,473 B1
(45) Date of Patent: Sep. 24, 2002

(54) INPUT OVERLOAD PROTECTION FOR MULTIPLE INPUT CONTROLLER

(75) Inventor: John C. Olson, Shoreview, MN (US)

(73) Assignee: American Standard Inc., Piscataway, NJ (US)

( * ) Notice: Subject to any disclaimer, the term of this patent is extended or adjusted under 35 U.S.C. 154(b) by 0 days.

(21) Appl. No.: 09/361,049

(22) Filed: Jul. 26, 1999

(51) Int. Cl.[7] .................................................. H02H 9/00
(52) U.S. Cl. ..................... 361/91.1; 361/93.9; 361/111; 361/115
(58) Field of Search ............................... 361/91.6, 91.1, 361/93.9, 111, 115; 307/117, 118; 700/276, 282, 292, 297, 298; 62/158, 161–166, 176.1, 176.5, 212

(56) References Cited

U.S. PATENT DOCUMENTS

| | | | |
|---|---|---|---|
| 4,313,308 A | 2/1982 | Boratgis et al. | 62/126 |
| 4,653,280 A | 3/1987 | Hansen et al. | 62/127 |
| 4,838,483 A * | 6/1989 | Nurczyk | 236/49.5 |
| 5,161,387 A | 11/1992 | Metcalfe et al. | 62/126 |
| 5,276,630 A | 1/1994 | Baldwin et al. | 364/505 |
| 5,368,786 A * | 11/1994 | Dinauer et al. | 261/130 |
| 5,465,190 A * | 11/1995 | Meunier et al. | 361/56 |
| 5,877,955 A * | 3/1999 | Struyk | 364/174 |
| 5,903,426 A * | 5/1999 | Ehling | 361/119 |
| 5,909,348 A * | 6/1999 | Zydek et al. | 361/79 |
| 5,956,247 A * | 9/1999 | Settles et al. | 364/140.01 |

* cited by examiner

Primary Examiner—Stephen W. Jackson
(74) Attorney, Agent, or Firm—William J. Beres; William O'Driscoll

(57) ABSTRACT

A current loop input overload protection system for a controller having multiple inputs includes zener diodes that limit the maximum voltage that can be applied to any input. If an electrical short of a temperature, pressure or humidity transducer forces an input to the maximum voltage, an electrical supply monitor immediately disables the transducer's power supply to protect the input components. After awhile, the overload protection system automatically and periodically attempts to reset the power supply to determine whether the short has been corrected.

19 Claims, 1 Drawing Sheet

INPUT OVERLOAD PROTECTION FOR MULTIPLE INPUT CONTROLLER

BACKGROUND OF THE INVENTION

1. Field of the Invention

Figure 1:
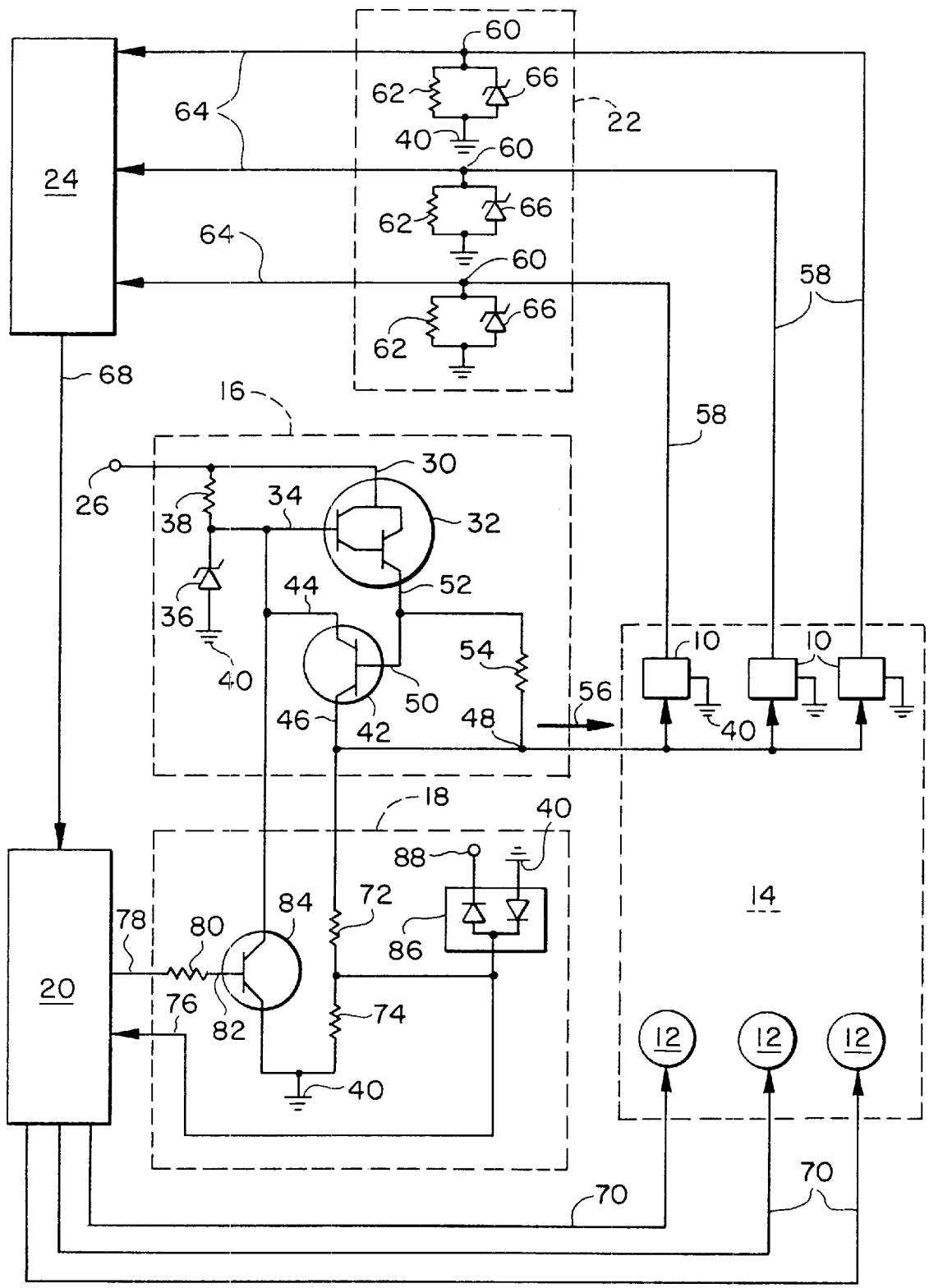

The subject invention generally pertains to HVAC controls that receive feedback signals from several thermodynamic sensors and more specifically to protecting the control's current loop inputs that receive sensors' feedback.

2. Description of Related Art

HVAC equipment (heating, ventilation and air conditioning equipment), such as heaters, air conditioners, heat pumps, blowers, humidifiers, dehumidifiers and VAV valves (variable air volume valves) typically condition the environment of a room or area within a building in response to sensors or transducers that sense a thermodynamic condition (e.g., temperature, pressure, humidity, etc.) of the area's environment. With generally large areas, as is the case with many commercial buildings, the area is often divided into separately conditioned comfort zones with each zone having its own sensor (The terms, "sensor" and "transducer" are being considered as equivalent and interchangeable).

Since control wiring is often low voltage, the sensors are often serviced while the control and the remainder of the HVAC system is still operating. The supply voltage is usually around 24 volts, and feedback signals from conventional sensors are usually no more than 5 volts or 4 to 20 mA. Leaving the control power on while servicing a sensor not only benefits the occupants of the area being conditioned but is also more convenient for an electrician doing the servicing. Unfortunately, such a practice can create a current overload problem if the electrician inadvertently shorts the sensor and briefly misapplies a full 24 volts across the control's input terminals.

Of course, conventional current limiting practices can be used to address this problem. For example, the control circuit could simply include a conventional fuse or circuit breaker. However, it is difficult to properly size a fuse for a generic, universal control for an indeterminate number of sensors that will be field-connected to the control. More specifically, a common fuse would need to handle the sum of the current delivered to all the sensors. Consequently, each control input would need to have more current carrying capacity than the fuse in order for the fuse to protect an individual input. Moreover, it would be a nuisance to have a brief inadvertent short cause an entire HVAC system to shutdown until manually reset.

Another approach is to simply size the control's input components to handle the excess current from a shorted sensor. But such an approach obviously adds cost and bulk to the control. The problem becomes worse when compact surface-mount input components are used in an attempt to reduce cost and bulk, as one loses the heat sink benefit previously provided by the electrical leads of components having such leads.

SUMMARY OF THE INVENTION

To protect the input components of an HAVC control system, it is an object of the invention is to limit the maximum voltage and current that can be applied to such input components and further disable the electrical power source should the voltage and current limits be reached.

Another object of the invention is to provide an input overload protection system that automatically and periodically attempts to reset itself after responding to an overload fault.

Another object is to provide an input overload protection system that can be used with an indeterminate number of sensors.

A further object is to provide an input overload protection system that is compatible with a variety of thermodynamic transducers including those that sense temperature, pressure and humidity.

A still further object of the invention is to provide an input overload protection system that allows the use of input components that are smaller and less expensive.

Yet another object is to provide an input overload protection system that allows the use of input components that have lower current carrying capacity.

Another object is to provide an input overload protection system that allows the use of input components that can be surface mounted rather than having to rely upon the heat-sinking property of through-hole soldered leads.

These and other objects of the invention are provided by an input overload protection system that includes several inputs. The voltage that a current feedback signal can apply to the inputs is limited to a predetermined maximum voltage by a voltage limiter at each input. An electrical supply monitor disables a power source upon detecting that the predetermined maximum voltage has been reached.

BRIEF DESCRIPTIONS OF THE DRAWINGS

FIG. 1 is an electrical schematic encompassing at least one embodiment of the invention.

DESCRIPTION OF THE PREFERRED EMBODIMENT

An HVAC system of FIG. 1 include several thermodynamic sensors 10 that affect the operation of HVAC equipment 12, which in turn condition the air of a comfort zone 14, such as a room or area within a building. Sensors 10 are schematically illustrated to represent a variety of sensors, examples of which include, but are not limited to, a temperature sensor or thermostat, a pressure sensor, and a humidity sensor. Equipment 12 is also schematically illustrated to represent a variety of equipment used to condition air. Some examples of equipment 12 include, but are not limited to, refrigeration systems, refrigeration compressors, heat pumps, furnaces, blowers and fans, humidifiers, dehumidifiers, baffles and dampers, rotary heat exchanger wheels, and VAV valves (i.e., variable air volume valves that adjustably throttle airflow through an air duct).

Sensors 10 affects the operation of equipment 12 by way of a control system that includes an electrical power source 16, an electrical supply monitor 18, and a control circuit comprising a logic circuit 20, an input circuit 22, and other ancillary components such as an A/D converter 24.

Power source 16 can assume a wide variety of configurations. In one embodiment, for example, power source 16 receives a generally unregulated 28 to 42VDC at a terminal 26. The voltage is applied to a collector 30 of a transistor 32 (e.g., an MJD112 by Motorola Semiconductor; of Austin, Texas) whose voltage at base 34 is partially determined by a zener diode 36 (e.g., a Motorola MMBZ5253B). Zener diode 36 is supplied by the unregulated voltage through a resistor 38 (e.g., 22 k ohms) and drains excess voltage (e.g., above 25VDC) to a ground 40. The voltage at base 34 is modulated by another transistor 42 (e.g., a Motorola MMBT2222A) that includes a collector 44 connected to base 34, an emitter 46 connected to an output terminal 48, and a base 50 controlled by an emitter 52 of transistor 32.

Transistor 32, in conjunction with zener diode 36, provides a substantially constant voltage of approximately 24 VDC at emitter 52. Transistor 42 limits the voltage drop across a resistor 54 to no more than 0.6 volts, thereby limiting the output current at terminal 48. For example, when resistor 54 is 7.5 ohms, the current through output terminal 48 is generally limited to 80 mA. In another embodiment, resistor 54 is 5 ohms to provide a total of 120 mA to serve five transducers (each consuming up to 20 mA, with an extra 20 mA to spare).

Through output terminal 48, power source 16 provides an electrical supply 56 of limited current to sensors 10. Each sensor 10 provides a feedback signal 58 that varies between and a lower and an upper limit (e.g., 0 to 5VDC or 4 to 20 mA) in response to a thermodynamic condition associated with comfort zone 14. In one embodiment, for example, sensor 10 is a model MRH-3-OA humidity sensor (by General Eastern of Woburn, Mass.) that provides a current feedback signal of 4 mA for 0% humidity and 20 mA for 100% humidity.

Feedback signals 58 are each conveyed to an input 60 of input circuit 22. Current from each feedback signal 58 passes through a resistor 62 (e.g., 200 ohms) tied to ground 40 to create an analog voltage signal 64 proportional to the feedback current. A zener diode 66 (e.g., a Motorola 1SMB5920BT3) connected in parallel with each resistor 62 serves as a voltage limiter that limits voltage signal 58 to a predetermined maximum voltage of, for example, 6.2 volts.

A/D converter 24 converts analog signals 64 to a digital signal 68 that is conveyed to logic circuit 20. Although logic circuit 20 is schematically illustrated to represent countless equivalent circuits using microprocessors, programmable logic controllers, integrated circuits, discrete components, and combinations thereof; in one embodiment, circuit 20 includes an AT90S1200SC microprocessor by Atmel Semiconductor of San Jose, California. In another embodiment, circuit 20 includes an Atmel AT90S2313SC microprocessor. In response to signals 68, logic circuit 20 provides control output signals 70 that control the operation of HVAC equipment 12. The specific algorithm or control scheme of circuit 20 depends on the particular equipment being controlled and its purpose. Such algorithms and control schemes vary widely and are well known to those skilled in the art (e.g., increase cooling in response to a sensed air temperature exceeding an upper limit).

To protect zener diodes 66 and resistors 62 from a current overload, electrical supply monitor 18 disables power source 16 when feedback signals 58 are inadvertently shorted directly to electrical supply 56. When such a short occurs, the affected zener diode 66 will clamp electrical supply 56 to a predetermined maximum voltage (e.g., determined by the characteristics of the zener). In the case of the 1SMB5920BT3 zener, that voltage is approximately 6.2 volts. Output terminal 48 applies the 6.2 volts across a voltage divider comprising resistors 72 and 74 (44 k and 4.7 k ohms respectively) to create, in this example, 0.7 volts at an input 76 of logic circuit 20. Circuit 20 interprets the 0.7 volt signal as a logic-0, and in response, outputs a logic-1 at an output 78. A logic-1 at output 78 is conveyed through a resistor 80 to a base 82 of a transistor 84 (e.g., a Motorola MMBT2222A). This turns transistor 84 on to basically clamp base 34 and collector 44 to ground 40, thereby interrupting electrical supply 56 by lowering its voltage and current to zero. This, in turn, discontinues the current being conveyed to input circuit 22.

After a predetermined time delay (e.g., provided by logic circuit 20), circuit 20 provides a logic-0 at output 78 to restore the normal operation of power source 16 in an attempt to automatically reset the control system. However, if the short still exists, the return of a logic-1 at input 76 will again disable power source 16. If desired, logic circuit 20 can be configured to automatically and periodically check whether the short has been corrected. In one embodiment, a transient voltage suppresser 86 (e.g., a Motorola BAV99) ensures that the voltage at input 76 stays within the limits of zero to 5VDC as determined by ground 40 and the 5VDC applied at a terminal 88.

Although the invention is described with respect to a preferred embodiment, various modifications thereto will be apparent to those skilled in the art. For example the specific circuit components, their specifications and arrangement can vary dramatically and still provide an embodiment that remains within the spirit of the invention. The various circuits, such as power source 16, supply monitor 18, logic circuit 20 and input circuit 22 can also be created using a variety of other integrated circuits, discrete electrical components, and combinations thereof to achieve the same general purpose disclosed herein. Therefore, the scope of the invention is to be determined by reference to the claims, which follow.

I claim:

1. An input overload protection system, comprising:
   a plurality of inputs each adapted to receive a current feedback signal and each having a voltage limiter adapted to limit said current feedback signal to a maximum voltage;
   a power source adapted to provide an electrical supply for said current feedback signal;
   an electrical supply monitor electrically coupled to said power source and adapted to interrupt said electrical supply upon said electrical supply reaching a limit created by said voltage limiter limiting said current feedback signal to said maximum voltage; and
   a plurality of transducers each of which receives said electrical supply to provide said current feed back signal in response to a thermodynamic condition, wherein said current feedback signal varies between an upper current limit and a lower current limit in response to said thermodynamic condition varying.

2. The input overload protection system of claim 1, wherein said voltage limiter limits said current feedback signal to said maximum voltage upon said current feedback signal exceeding said upper current limit.

3. The input overload protection system of claim 1, wherein said thermodynamic condition is humidity.

4. The input overload protection system of claim 1 further comprising a plurality of variable air volume valves and a control adapted to receive each said current feedback signal from said plurality of inputs and provide a plurality of output signals in response thereto to vary a degree of opening of said plurality of variable air volume valves.

5. An input overload protection system, comprising:
   a plurality of inputs each adapted to receive a current feedback signal and each having a voltage limiter adapted to limit said current feedback signal to a maximum voltage;
   a power source adapted to provide an electrical supply for said current feedback signal; and
   an electrical supply monitor electrically coupled to said power source and adapted to interrupt said electrical supply upon said electrical supply reaching a limit created by said voltage limiter limiting said current feedback signal to said maximum voltage;
   wherein said voltage limiter includes a zener diode.

6. The input overload protection system of claim 5, further comprising a resistor connected in parallel with said zener diode, whereby a voltage developed across said resistor reflects said current feedback signal passing therethrough when said current feedback signal is less than said maximum voltage, and when said current feedback signal reaches said maximum voltage, a portion of said current feedback signal passes through said zener diode.

7. An input overload protection system, comprising:
a plurality of inputs each adapted to receive a current feedback signal and each having a voltage limiter adapted to limit said current feedback signal to a maximum voltage;
a power source adapted to provide an electrical supply for said current feedback signal; and
an electrical supply monitor electrically coupled to said power source and adapted to interrupt said electrical supply upon said electrical supply reaching a limit created by said voltage limiter limiting said current feedback signal to said maximum voltage;
wherein said power source adjusts an output voltage of said electrical supply to limit an output current thereof, and wherein said electrical supply monitor interrupts said electrical supply upon said output voltage dropping to said limit.

8. The input overload protection system of claim 7, wherein said electrical supply monitor includes a voltage divider and a digital integrated circuit, wherein said voltage divider creates a digital logic signal based upon said output voltage, and said digital integrated circuit interprets said digital logic signal to determine whether to interrupt said electrical supply.

9. The input overload protection system of claim 1, further comprising a time delay activated upon said electrical supply monitor interrupting said electrical supply, wherein after said time delay said electrical supply monitor allows said power source to attempt to again provide said electrical supply within said limit.

10. An input overload protection system, comprising:
a plurality of inputs each adapted to receive a current feedback signal and each having a voltage limiter adapted to limit said current feedback signal to a maximum voltage;
a power source adapted to provide an electrical supply for said current feedback signal;
a plurality of transducers each of which receives said electrical supply to provide said current feed back signal in response to a thermodynamic condition, wherein said current feedback signal varies between an upper current limit and a lower current limit in response to said thermodynamic condition varying and wherein said voltage limiter limits said current feedback signal to said maximum voltage upon said current feedback signal exceeding said upper current limit; and
an electrical supply monitor electrically coupled to said power source and adapted to interrupt said electrical supply upon said electrical supply reaching a limit created by said voltage limiter limiting said current feedback signal to said maximum voltage.

11. The input overload protection system of claim 10, wherein said thermodynamic condition is humidity.

12. The input overload protection system of claim 10, further comprising a plurality of variable air volume valves and a control adapted to receive each said current feedback signal from said plurality of inputs and provide a plurality of output signals in response thereto to vary a degree of opening of said plurality of variable air volume valves.

13. The input overload protection system of claim 10, wherein said voltage limiter includes a zener diode.

14. The input overload protection system of claim 13, further comprising a resistor connected in parallel with said zener diode, whereby a voltage developed across said resistor reflects said current feedback signal passing therethrough when said current feedback signal is less than said maximum voltage, and when said current feedback signal reaches said maximum voltage, a portion of said current feedback signal passes through said zener diode.

15. The input overload protection system of claim 10, wherein said power source adjusts an output voltage of said electrical supply to limit an output current thereof, and wherein said electrical supply monitor interrupts said electrical supply upon said output voltage dropping to said limit.

16. The input overload protection system of claim 15, wherein said electrical supply monitor includes a voltage divider and a digital integrated circuit, wherein said voltage divider creates a digital logic signal based upon said output voltage, and said digital integrated circuit interprets said digital logic signal to determine whether to interrupt said electrical supply.

17. The input overload protection system of claim 10, further comprising a time delay activated upon said electrical supply monitor interrupting said electrical supply, wherein after said time delay said electrical supply monitor allows said power source to attempt to again provide said electrical supply within said limit.

18. A method of protecting a multiple input controller, comprising:
providing a limited current supply;
creating a feedback signal from said limited current supply;
varying said feedback signal as a function of a thermodynamic condition;
conveying said feedback signal to said multiple input controller;
limiting a voltage of said feedback signal to a predetermined upper limit; and
interrupting said limited current supply in response to said feedback signal reaching said predetermined upper limit.

19. An input overload protection system, comprising:
a plurality of variable air volume valves;
a plurality of inputs each adapted to receive a current feedback signal and each having a zener diode adapted to limit said current feedback signal to a maximum voltage;
a resistor connected in parallel with said zener diode, whereby a voltage developed across said resistor indicates said current feedback signal passing therethrough when said current feedback signal is less than said maximum voltage, and when said current feedback signal reaches said maximum voltage, a portion of said current feedback signal passes through said zener diode;
a control adapted to receive each said current feedback signal from said plurality of inputs and provide a plurality of output signals in response thereto to vary a degree of opening of said plurality of variable air volume valves;
a power source adapted to provide an electrical supply for said current feedback signal, an output voltage of said electrical supply being adjusted by said power source to limit an output current thereof;
a plurality of transducers each of which receives said electrical supply to provide said current feed back signal in response to a thermodynamic condition, wherein said current feedback signal varies between an upper current limit and a lower current limit in response to said thermodynamic condition varying, and wherein said zener diode limits said current feedback signal to said maximum voltage upon said current feedback signal exceeding said upper current limit;

an electrical supply monitor electrically coupled to said power source and adapted to interrupt said electrical supply upon said output voltage of said electrical supply dropping to a predetermined limit created by said zener diode limiting said current feedback signal to said maximum voltage, wherein said electrical supply monitor includes a voltage divider and a digital integrated circuit, wherein said voltage divider creates a digital logic signal based upon said output voltage, and said digital integrated circuit interprets said digital logic signal to determine whether to interrupt said electrical supply; and a time delay activated upon said electrical supply monitor interrupting said electrical supply, wherein after said time delay said electrical supply monitor allows said power source to attempt to again provide said electrical supply within said limit.

* * * * *